United States Patent
Ritz

(10) Patent No.: US 8,397,270 B2
(45) Date of Patent: Mar. 12, 2013

(54) ELECTRONIC APPARATUS GENERATING VIDEO SIGNALS AND PROCESS FOR GENERATING VIDEO SIGNALS

(75) Inventor: Edouard Ritz, Sèvres (FR)

(73) Assignee: Thomson Licensing (FR)

( * ) Notice: Subject to any disclaimer, the term of this patent is extended or adjusted under 35 U.S.C. 154(b) by 1746 days.

(21) Appl. No.: 10/759,000

(22) Filed: Jan. 16, 2004

(65) Prior Publication Data

US 2004/0146207 A1    Jul. 29, 2004

(30) Foreign Application Priority Data

Jan. 17, 2003 (FR) ...................................... 03 00582

(51) Int. Cl.
*H04N 7/16* (2011.01)

(52) U.S. Cl. ........ 725/139; 725/151; 345/501; 345/530; 345/629; 345/638

(58) Field of Classification Search .................... 725/37, 725/139, 151
See application file for complete search history.

(56) References Cited

U.S. PATENT DOCUMENTS

| | | | | |
|---|---|---|---|---|
| 4,956,707 A | * | 9/1990 | Oakley et al. ................. | 348/441 |
| 5,045,946 A | * | 9/1991 | Yu ................................. | 348/565 |
| 5,333,061 A | * | 7/1994 | Nakashima et al. ............ | 386/52 |
| 5,838,335 A | * | 11/1998 | Hamamoto ..................... | 345/501 |
| 5,956,459 A | * | 9/1999 | Kato et al. ...................... | 386/95 |
| 6,005,629 A | * | 12/1999 | Douche et al. ........... | 375/240.26 |
| 6,434,097 B1 | * | 8/2002 | Lewis et al. ................. | 369/47.11 |
| 6,636,222 B1 | * | 10/2003 | Valmiki et al. ................ | 345/505 |
| 6,661,422 B1 | * | 12/2003 | Valmiki et al. ................ | 345/530 |
| 6,744,472 B1 | * | 6/2004 | MacInnis et al. ............. | 348/441 |
| 6,768,774 B1 | * | 7/2004 | MacInnis et al. ........ | 375/240.15 |
| 6,839,071 B1 | * | 1/2005 | Miyamoto ..................... | 715/788 |
| 2001/0055011 A1 | * | 12/2001 | Terao et al. .................... | 345/204 |
| 2002/0085088 A1 | * | 7/2002 | Eubanks ......................... | 348/22 |
| 2002/0149626 A1 | | 10/2002 | Ozcelik et al. | |
| 2003/0043172 A1 | * | 3/2003 | Li et al. .......................... | 345/636 |
| 2003/0169372 A1 | * | 9/2003 | Huang et al. .................. | 348/569 |
| 2004/0205828 A1 | * | 10/2004 | Fujimoto ....................... | 725/133 |

FOREIGN PATENT DOCUMENTS

| | | |
|---|---|---|
| EP | 0840277 A2 | 5/1998 |
| JP | 11259057 * | 9/1999 |

OTHER PUBLICATIONS

Patent Abstracts of Japan, vol. 1998, No. 12, Oct. 31, 1998 & JP 10 200873.
French Search Report of Jul. 14, 2003.

* cited by examiner

*Primary Examiner* — Vivek Srivastava
*Assistant Examiner* — Ricky Chin
(74) *Attorney, Agent, or Firm* — Jack Schwartz and Associates, PLLC

(57) ABSTRACT

An electronic apparatus stores in a graphics memory a first and a second graphics object. An OSD processor generates a first digital stream which represents the first graphics object. The second graphics object is converted into picture data, for example by a main controller, and these data are written to a picture memory, from which a second digital stream is generated. A mixer combines the first and the second digital stream into a video signal to be displayed.

6 Claims, 1 Drawing Sheet

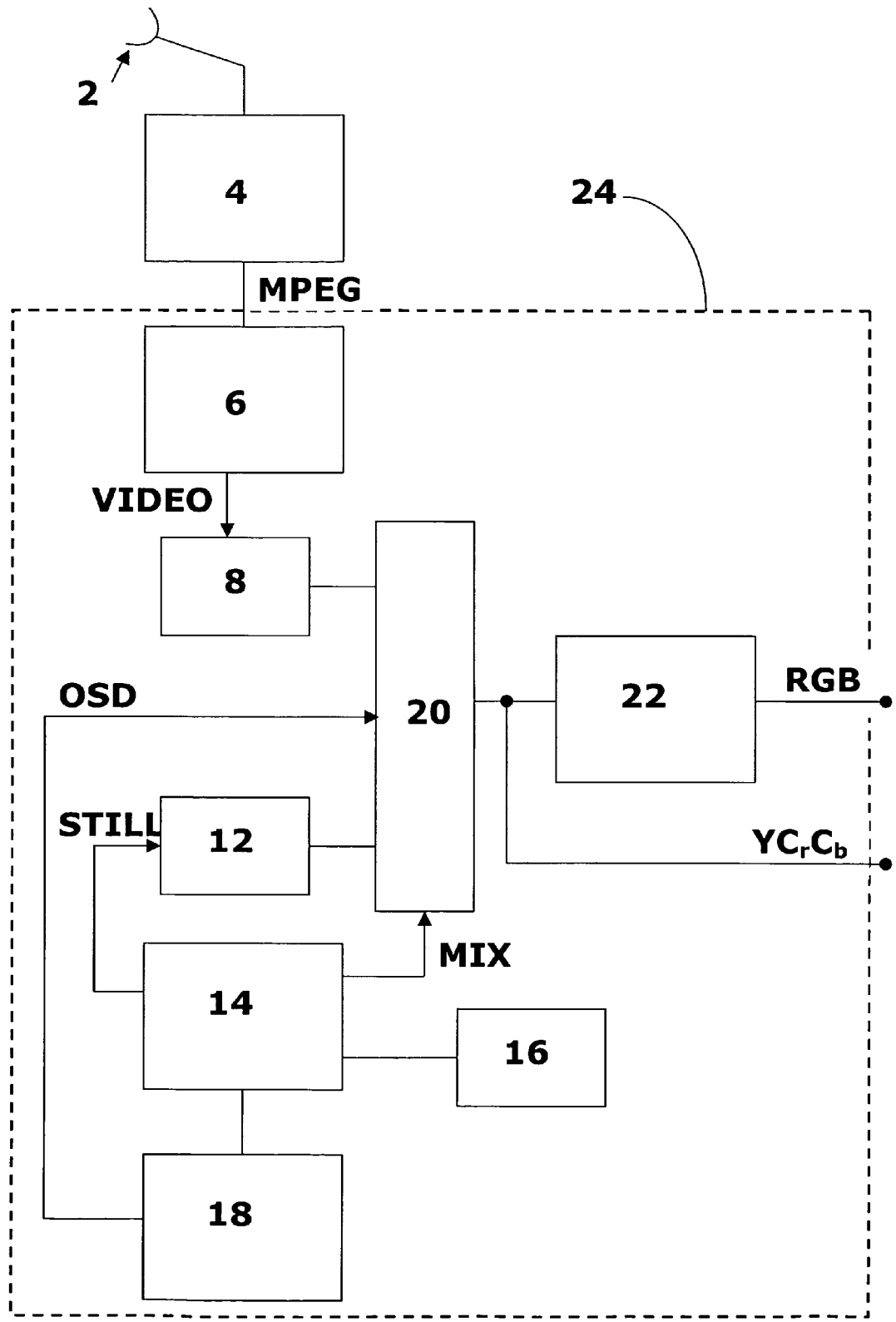

ELECTRONIC APPARATUS GENERATING VIDEO SIGNALS AND PROCESS FOR GENERATING VIDEO SIGNALS

This application claims the benefit under 35 U.S.C. §119(a) of French patent application No. 0300582 filed Jan. 17, 2003.

FIELD OF THE INVENTION

The invention relates to an electronic apparatus generating video signals, such as a digital decoder, and to a process for generating video signals.

BACKGROUND OF THE INVENTION

Such an apparatus generates video signals to be screened on the apparatus itself (television for example) or on an apparatus into which it will be plugged (display plugged into a digital decoder for example). The video signals to be screened are for example of the CVBS type (standing for Composite Video Baseband Signal) or RGB type (composed of three monochromic signals, red, green and blue).

These video signals are in general reconstructed by the electronic apparatus from information cues read from a medium (optical disc for example) or received from a remote transmitter, and which represent a main video sequence (or main picture when dealing with a stationary picture).

Frequently, the electronic apparatus can display graphics objects superimposed on this main video sequence, for example to display control menus for the apparatus. This superposition (or OSD standing for On-Screen Display) is performed by supplementing the video signal with information cues which represent the graphics object. A method of superposition is for example described in U.S. Pat. No. 5,953,691.

According to a particular design, described for example in Patent Application EP 0 840 277, the electronic apparatus comprises several memories each of which stores a particular picture (i.e. a particular plane) and a mixer which generates a video signal which combines the content of the various planes. Generally, use is made of a video plane, (video memory) that contains the main video sequence, an OSD plane managed by an OSD processor and that contains the menus and graphics objects to be superimposed on the main video sequence and a stationary image plane (stationary picture memory or still plane) which can serve, for example to display a stationary picture.

This solution allows great flexibility in the displaying of the various planes. However, certain OSD processors are limited in their capacity to manage the OSD plane. In particular, certain OSD processors do not make it possible to display two graphics objects which share the same lines of the screen.

SUMMARY OF THE INVENTION

In order to notably circumvent this limitation in apparatuses in which a part of the memory (for example the stationary picture memory) is not used, the invention proposes an electronic apparatus comprising a graphics memory storing a first and a second graphics object, an OSD processor generating a first digital stream representing the first graphics object, a pictures memory containing a picture and generating a second digital stream, a mixer able to mix the first digital stream and the second digital stream into a video signal, means for converting the second graphics object into picture data and means for writing the picture data to the picture memory.

According to possible embodiments, the electronic apparatus also comprises one or more of the following elements:
  means for detecting overlaps between the first and the second graphics objects generating an overlap cue;
  means for controlling the mixer, means for conversion and means for writing as a function of the overlap cue;
  a video memory supplied by a decoder and linked to the mixer.

Thus, the second memory is used only when necessary, that is to say when an overlap is detected.

In a preferred manner, in order to use existing electronic circuits, the picture memory is a stationary picture memory.

The video signal is for example transmitted to an output connector, as in the case where the electronic apparatus is a digital decoder.

Preferably, the means for converting the second graphics object into picture data are a piece of software executed by a main controller. The flexibility of operation of the system is thus improved.

The invention thus proposes a process for generating a video signal, comprising the following steps:
  generation by an OSD processor of a first digital stream representing a first graphics object;
  conversion of a second graphics object into a picture;
  writing of the picture to a memory;
  generation of a second digital stream from the memory;
  mixing of the first digital stream and of the second digital stream;
  generation of a video signal from the said mixture.

Preferably, the said mixture is produced with application of a transparency coefficient.

Such a process can, for example have more precisely the following steps:
  reception of a command to display a first and a second graphics object;
  detection of a possible overlap between the first and the second graphics object;
  if absence of overlap, generation by an OSD processor of a digital stream representing the first graphics object and the second graphics object, and generation of a video signal based on the digital stream;
  if presence of an overlap:
    generation by an OSD processor of a first digital stream representing a first graphics object;
    conversion of the second graphics object into a picture;
    writing of the picture to a memory;
    generation of a second digital stream from the memory;
    mixing of the first digital stream and of the second digital stream;
    generation of a video signal from the said mixture.

The invention proposes an electronic apparatus comprising an OSD processor managing an OSD plane and a mixer able to mix a picture plane and the OSD plane, with means for converting a graphics object into picture data and means for writing the picture data to the picture plane.

BRIEF DESCRIPTION OF THE DRAWINGS

Other characteristics and advantages of the invention will become apparent in the light of the detailed description which follows given with reference to the appended FIG. 1, which represents the main elements of a digital decoder embodied in accordance with the teachings of the invention.

DETAILED DESCRIPTION OF A PREFERRED EMBODIMENT

A digital decoder as represented in FIG. 1 receives from an antenna 2 a modulated electrical signal which represents data relating to several multiplexed digital streams. A tuning, demodulation and demultiplexing assembly 4 (the detail of which will not be described here) selects a particular digital stream (as a function of the user's choice). At output the assembly 4 generates this particular digital stream such as it was coded in the electrical signal received, in general compressed according to the MPEG standard.

The MPEG digital stream is transmitted to a decoder 6 (here an MPEG decoder). The decoder 6 reconstructs an uncompressed digital stream from the MPEG digital stream. The uncompressed digital stream (for example of the $YC_rC_b$ type) is a string of pictures to be displayed. The decoder 6 successively writes each VIDEO image in the 4:2:2 format to a video memory 8.

An OSD processor 18 manages the displaying of graphics objects to be superimposed on the video upon request from a main controller 14. To do this, the main controller 14 transmits to the OSD processor 18 a chained list of graphics objects which provide a description of the graphics objects stored in a graphics memory 16.

Each graphics object is described in the chained list by the following elements:
co-ordinates x, y of the upper left corner of the object;
dimension in pixels (width and height) of the object;
memory address of the digitised picture in a graphics format (or pixmap standing for picture map);
memory address
graphics format, for example use of a colour palette, (CLUT 1, CLUT 4, CLUT 16, CLUT 256), use of the RGB format (RGB 16, RGB 24) or use of the RGB format with mixing coefficient (ARGB 1555, ARGB 8888);
possibly, memory address of the colour palette (or CLUT standing for Colour Look-Up Table).

A first exemplary implementation of the invention will now be described in the simplest case where the chained list contains a single graphics object, subsequently referred to as the first graphics object.

The OSD processor 18 receives from the main processor 14 the chained list comprising the first graphics object. The OSD processor 18 generates an OSD digital stream representing the first graphics object in the 4:2:2 format destined for a mixer 20.

The content of the video memory 8 (VIDEO picture) is read in synchronism by the mixer 20 which thus superimposes the VIDEO picture and the OSD picture and which generates a $YC_rC_b$ digital stream at output. This digital stream is on the one hand sent to an output connector of the apparatus destined for displays having a digital input (digital video signal) and on the other hand transmitted to a video encoder 22 which converts it into an RGB analogue video signal. The RGB analogue video signal is transmitted to a connector destined for a display. The connector is for example a SCART socket.

Other types of signals may of course be used at output, such as for example, a signal of the CVBS type.

When the display of a second graphics object is requested, the main controller 14 verifies whether the two graphics objects extend over common lines of the screen, that is to say whether there is overlap between the two graphics objects. To do this, the data regarding the co-ordinates and dimensions, as described above, of the objects are naturally used.

In the absence of overlap, the second graphics object is then inserted into the chained list of objects to be displayed, as will be described in detail hereinbelow. The main controller 14 then transmits to the OSD processor 18 the chained list comprising the first and the second graphics object. The OSD picture generated by the OSD processor 18 thus comprises a representation of the first graphics object and a representation of the second graphics object.

The second graphics object therefore appears superimposed on the main video sequence (VIDEO picture) by the mixing performed by the mixer 20 between the stream emanating from the VIDEO memory 8 and the stream generated by the OSD processor 18.

The solution just set forth cannot however be used in case of overlap since the OSD processor 18 does not know how to manage the presence of two graphics objects with overlap.

In case of overlap, the main control 14 converts the second graphics object into a STILL picture in the 4:2:2 (or 4:2:0), and writes this STILL picture into a stationary picture memory 12 YCrCb format.

The main controller 14 also instructs (by means of the signal MIX) the mixer 22 to superimpose the content of the stationary picture memory 12 onto the content of the video memory 8 in addition to the OSD plane.

The video signal $YC_rC_b$ at the output of the mixer (and thus the RGB video signal at the output of the apparatus) therefore represents the superposition of the main video sequence (video memory 8), of the first graphics object (OSD processor 18) and of the second object (stationary picture memory 12).

The main controller 14 determines the mode of the superposition carried out by the mixer 20. For example, the main controller 14 specifies a mixing coefficient (sometimes referred to as the blending coefficient) between the various pictures (or various planes).

The addition of a new graphics object to the display when the stationary picture memory 12 is not used will now be described in a general manner.

The set of graphics objects to be displayed by the OSD processor 18 is a chained list ordered as a function of the position of display of the objects (from top to bottom). Thus, the tag (or header) relating to each object comprises a pointer to the next object; the last object comprises a pointer to the first object.

In order to display a new graphics object, one first searches for a possible overlap with the graphics objects already displayed through the intermediary of the OSD processor. To do this, the chained list of objects is traversed to verify whether one of the lines of the objects of the chained list corresponds to a line of the new graphics object to be displayed.

If such is the case, that is to say if there is overlap, the new graphics object cannot be displayed by the OSD processor 18 (and is therefore not inserted into the chained list). As explained above, in this case, the new graphics object is converted into a STILL picture which will then be written to the stationary picture plane 12 and superimposed on the display by appropriate instruction of the mixer 20.

If such is not the case, that is to say if there is no overlap of the new graphics object with any of the objects of the chained list, the new graphics object is inserted into the chained list between the object immediately above the one to be displayed and the object immediately below the one to be displayed. (Naturally, if there is no object above the new object, the new object becomes the first object of the list and points to the object situated first before its insertion; likewise, if there is no object below the new object, the new object becomes the last object and points to the first object).

By its insertion into the chained list, the new object is thus displayed by the OSD processor 18 together with the other objects of the chained list (OSD plane).

The addition of a new graphics object to the display when the stationary picture memory 12 is already used for the display, as proposed hereinabove, of one or more graphics objects will now be described.

Firstly, one searches for a possible overlap between the lines of the new graphics object and the lines of the graphics objects displayed by the OSD processor 18.

In case of absence of overlap, the new graphics object can be inserted into the chained list transmitted to the OSD processor 18 and displayed by the OSD processor 18 in the OSD plane.

In case of overlap with the graphics objects displayed by the OSD processor 18, the new graphics object will have to be displayed by conversion of the object into a picture and writing to the stationary picture plane 12 as described above.

To do this, a possible overlap between the new graphics object and the graphics object already displayed by the stationary picture memory (or plane) 12 is detected.

In case of absence of overlap, the new graphics object is converted into a picture part in the 4:2:2 format and these data are written while inserting them (simple superposition) into the picture present beforehand in the stationary picture memory 12 (which represents graphics objects already displayed through this intermediary).

In case of overlap between the new object and the objects already displayed, the new object is converted into a picture part in the 4:2:2 format and these data are written to the stationary picture memory 12 while mixing them with the objects already displayed (with an appropriate blending coefficient) in the overlap regions. One thus carries out a software superposition of the various graphics objects to be displayed by way of the stationary picture plane 12.

In the case where a graphics object is displayed by the stationary picture memory (or plane) 12, provision is advantageously made to verify the possibility of inserting it into the chained list of graphics objects with each deletion of an object from the chained list.

More precisely, after having deleted a graphics object from the chained list, one searches for a line overlap between each object displayed by way of the stationary picture memory 12 and each of the graphics objects remaining in the chained list.

If no overlap is encountered between the lines of a graphics object displayed by the stationary picture memory 12 and the lines of the graphics objects displayed by the OSD processor 18, this graphics object is inserted into the chained list (at the place belonging to it as a function of its position on the screen) and the data corresponding to this object are erased from the stationary picture memory 12 (zeroing of the corresponding pixels). The graphics object previously displayed by the stationary picture memory 12 is therefore then displayed by the OSD processor 18.

If this graphics object was the only object displayed by the stationary picture memory 12, the stationary picture memory 12 can thus be released. The mixer 20 is then instructed to ignore the data contained in the stationary picture memory 12.

The decoder 6, the memories 8, 10, 12, 16, the mixer 20, the main controller 14, the OSD processor 18 and the video encoder 22 may be brought together on one and the same integrated circuit 24, such as for example a circuit from the LSI Logic SC200x family.

In the foregoing description, the word "memory" should be understood in the software sense, that is to say in the sense of a memory area. It need not of course necessarily be a dedicated physical memory.

What is claimed, is:

1. An electronic apparatus comprising:
   a graphics memory storing a first and a second graphics object;
   a video memory supplied by a decoder;
   a pictures memory;
   a main controller for;
      detecting overlaps between the first and the second graphics objects;
      generating an overlap cue; and
      in presence of overlap, converting the second graphics object into picture data, and writing the picture data to the pictures memory;
   an OSD processor, unable to manage the graphics objects that overlap, generating a first digital stream representing, in presence of overlap the first graphics object, and in absence of overlap the first graphics object and the second graphics object; and
   mixing means for mixing said first digital stream, received from said OSD processor, said second digital stream, received from said still picture data, and a video stream received from the video memory, into a video signal.

2. An electronic apparatus according to claim 1, comprising a means for controlling the mixing means, means for conversion and means for writing as a function of the overlap cue.

3. An electronic apparatus according to claim 1, wherein the video signal is transmitted to an output connector.

4. An electronic apparatus according to claim 1, wherein the means for converting the second graphics object into picture data are a piece of software executed by a main controller.

5. An electronic apparatus according to claim 1, in which the picture memory is a stationary picture memory.

6. A process for generating a video signal, comprising the following steps:
   reception of a command to display a first and a second graphics object;
   detection of a possible overlap between the first and the second graphics object;
   if absence of overlap, generation by an OSD processor of a digital stream representing the first graphics object and the second graphics object, and generation of a video signal based on a mixing of the digital stream with a video stream received from a memory, said OSD processor being unable to manage two graphics objects that overlap;
   if presence of an overlap:
      generation by said OSD processor of a first digital stream representing a first graphics object;
      conversion of the second graphics object into a still picture;
      writing of the still picture to a memory;
      generation of a second digital stream from said still picture in the memory;
      mixing of the first digital stream, received from said OSD processor, of the second digital stream, generated from said still picture received from said graphics memory and of a video stream; and
      generation of a video signal from said mixture.

* * * * *